(12) United States Patent
Tanno

(10) Patent No.: US 11,554,616 B2
(45) Date of Patent: Jan. 17, 2023

(54) PNEUMATIC TIRE WITH REMOVABLY MOUNTED RUN-FLAT LOAD SUPPORT BODIES

(71) Applicant: The Yokohama Rubber Co., LTD., Tokyo (JP)

(72) Inventor: Atsushi Tanno, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 646 days.

(21) Appl. No.: 16/465,546

(22) PCT Filed: Nov. 30, 2016

(86) PCT No.: PCT/JP2016/085547
§ 371 (c)(1),
(2) Date: May 30, 2019

(87) PCT Pub. No.: WO2018/100671
PCT Pub. Date: Jun. 7, 2018

(65) Prior Publication Data
US 2019/0283508 A1     Sep. 19, 2019

(51) Int. Cl.
*B60C 17/00* (2006.01)
*B60C 17/04* (2006.01)
*B60C 17/06* (2006.01)

(52) U.S. Cl.
CPC ............ *B60C 17/06* (2013.01); *B60C 17/009* (2013.01); *B60C 17/0009* (2013.01);
(Continued)

(58) Field of Classification Search
CPC ....... B60C 17/009; B60C 17/00; B60C 17/06; B60C 17/061; B60C 17/065;
(Continued)

(56) References Cited

U.S. PATENT DOCUMENTS 4,371,023 A * 2/1983 Campagna .............. B60C 17/06
152/158
8,444,795 B2 * 5/2013 Tanno
(Continued)

FOREIGN PATENT DOCUMENTS

JP    H07-304312    11/1995
JP    2003-094912    4/2003
(Continued)

OTHER PUBLICATIONS

International Search Report for International Application No. PCT/JP2016/085547 dated Feb. 28, 2017, 4 pages, Japan.

*Primary Examiner* — Adrienne C. Johnstone
(74) *Attorney, Agent, or Firm* — Thorpe North & Western

(57) ABSTRACT

In a pneumatic tire including an annular tread portion extending in a tire circumferential direction, a pair of sidewall portions disposed on both sides of the tread portion, and a pair of bead portions disposed on an inner side of the sidewall portions in a tire radial direction, a load support body is disposed extending along the tire circumferential direction on an inner side of each of the sidewall portions, and the load support body is removably mounted to an inner surface of the sidewall portion via a mechanical engagement device.

7 Claims, 29 Drawing Sheets

(52) U.S. Cl.
CPC ............ *B60C 17/04* (2013.01); *B60C 17/047* (2013.01); *B60C 2017/0054* (2013.01)

(58) Field of Classification Search
CPC ............ B60C 17/066; B60C 2017/063; B60C 2017/068; B60C 17/0009; B60C 17/0018; B60C 17/0027; B60C 17/0036; B60C 17/0045; B60C 2017/0054; B60C 2017/0063; B60C 2017/0072; B60C 2017/0081; B60C 17/04; B60C 17/047; B60C 17/048; B29D 2030/724
USPC .................................. 152/155–158, 516–520
See application file for complete search history.

(56) References Cited

U.S. PATENT DOCUMENTS

| | | | |
|---|---|---|---|
| 2004/0187994 A1* | 9/2004 | Hsu | B60C 17/009 152/158 |
| 2005/0115656 A1* | 6/2005 | Hsieh | B60C 17/009 152/520 |
| 2015/0027607 A1* | 1/2015 | Satpathy | B60C 17/00 |
| 2015/0306831 A1 | 10/2015 | Joza et al. | |
| 2016/0229140 A1 | 8/2016 | Tanno et al. | |
| 2016/0243904 A1 | 8/2016 | Tanno et al. | |
| 2019/0184767 A1* | 6/2019 | Zemla | B60C 17/009 |

FOREIGN PATENT DOCUMENTS

| | | |
|---|---|---|
| JP | 2007-098992 | 4/2007 |
| JP | 2009-061866 | 3/2009 |
| JP | 2012-025319 | 2/2012 |
| JP | 2015-063170 | 4/2015 |
| JP | 2015-063171 | 4/2015 |
| WO | WO 2014/088064 | 6/2014 |
| WO | WO 2015/045459 | 4/2015 |
| WO | WO 2015/045460 | 4/2015 |
| WO | WO-2018009606 A1 * | 1/2018 |

* cited by examiner

PNEUMATIC TIRE WITH REMOVABLY MOUNTED RUN-FLAT LOAD SUPPORT BODIES

TECHNICAL FIELD

The present technology relates to a pneumatic tire capable of run-flat traveling using a load support body, more specifically to a pneumatic tire capable of suppressing deterioration of rolling resistance and riding comfort during normal traveling to the minimum even when a load support body is disposed on the sidewall portion, and also capable of enhancing reusability after run-flat traveling.

BACKGROUND ART

In the related art of pneumatic tires that can travel while punctured using a load support body, a side reinforced type pneumatic tire is known (see, for example, Japan Unexamined Patent Publication Nos. H07-304312, 2003-094912, 2007-098992 and 2009-061866) that includes a side reinforcing layer constituted by a rubber composition disposed on the inner side of the sidewall portion.

However, when the side reinforcing layer constituted by the rubber composition is integrally formed on the inner side of the sidewall portion, while the side reinforcing layer makes run-flat traveling possible, there is a problem of deteriorating rolling resistance and riding comfort during normal traveling. In particular, in a pneumatic tire having a high aspect ratio, that is, in a pneumatic tire having a large dimension in the tire radial direction of the sidewall portion, the volume of the side reinforcing layer is increased, so the deterioration of rolling resistance and riding comfort becomes significant. Therefore, in a pneumatic tire having a high aspect ratio, a side reinforced type run-flat tire has not been realized.

Further, in a case in which the side reinforcing layer described above is damaged through run-flat traveling, the side reinforced type pneumatic tire is not reusable after the run-flat traveling. For that reason, even if there is no problem with the tire casing structure and there is sufficient remaining tread portion grooves left after the run-flat traveling, the tire itself needs replacing, which also is not preferable from a resource conservation perspective.

SUMMARY

The present technology provides a pneumatic tire capable of suppressing deterioration of rolling resistance and riding comfort during normal traveling to the minimum even when a load support body is disposed on the sidewall portion, and also of enhancing reusability after run-flat traveling.

A pneumatic tire according to an embodiment of the present technology includes: an annular tread portion extending in a tire circumferential direction; a pair of sidewall portions disposed on both sides of the tread portion; and a pair of bead portions disposed on an inner side of the sidewall portions in a tire radial direction, wherein a load support body is disposed extending along the tire circumferential direction on an inner side of each of the sidewall portions, and the load support body is removably mounted to an inner surface of the sidewall portion via a mechanical engagement device.

The inventors of the present technology learned, as a result of an intensive study on run-flat traveling of a pneumatic tire, that, because run-flat traveling causes a load support body disposed on the inner side of the sidewall portion to be put in a state of being wrapped by the sidewall portion, the run-flat traveling can be stably continued even when the load support body is fixed to the inner surface of the sidewall portion via a mechanical engagement device, thus leading to the present technology.

Namely, in an embodiment of the present technology, due to disposing a load support body extending in the tire circumferential direction on the inner side of each sidewall portion, and mounting the load support body to the inner surface of the sidewall portion via a mechanical engagement device, deterioration of rolling resistance and riding comfort during normal traveling can be suppressed to the minimum, while enabling a stable run-flat traveling, in comparison with the case in which the side reinforcing layer constituted by a rubber composition is integrally formed on the inner side of the sidewall portion as in the related art. In addition, since the load support body is removably mounted to the inner surface of the sidewall portion via a mechanical engagement device, even if the load support body is damaged during run-flat traveling, the tire itself may be reused by exchanging only the load support body, enhancing the reusability after the run-flat traveling. Moreover, the above-described configuration is also applicable to a pneumatic tire having a high aspect ratio (for example, an aspect ratio of 65% or greater), and the run-flat tire is easily manufactured.

In an embodiment of the present technology, the mechanical engagement device is preferably a pair of surface fasteners. Using a pair of surface fasteners, a load support body can be easily mounted and removed, and stably retained during run-flat traveling.

More specifically, a pair of surface fasteners are constituted by a hook-side surface fastener and a loop-side surface fastener, the hook-side surface fastener is vulcanization-adhered to the inner surface of the sidewall portion, and the loop-side surface fastener is attached to the load support body. According to such a configuration, the load support body can be stably retained in run-flat traveling.

In addition, shear force in an engaged state of the pair of surface fasteners is preferably equal to or greater than 0.6 $kgf/cm^2$ and a peel strength is equal to or greater than 200 gf/cm. The retention capability to retain the load support body during run-flat traveling can be thereby sufficiently secured. Note that shear force (tensile shear strength) and peel strength (release strength) are measured in accordance with JIS (Japanese Industrial Standard)-L3416.

In an embodiment of the present technology, it is preferable that the mechanical engagement device is disposed on part of a region of a surface of the load support body contacting the inner surface of the sidewall portion during run-flat traveling, and in other region the load support body directly contacts the inner surface of the sidewall portion without being interposed by the mechanical engagement device. In this case, it is possible to reduce the contact area between the load support body and the sidewall portion during normal traveling, and effectively suppress deterioration of rolling resistance and riding comfort during normal traveling.

In this case, it is preferable to provide a projection on the inner surface of the sidewall portion configured to lock an end portion of the load support body during run-flat traveling. This enables the integrity of the load support body and the sidewall portion to be enhanced during run-flat traveling.

In addition, it is also preferable that the load support body includes an outer wall surface contacting the inner surface of the sidewall portion and an inner wall surface facing a tire inner cavity side, and the inner wall surface is a flat surface or a curved surface recessed outward in a tire lateral direction. Defining the shape of the inner wall surface of the load support body as described above enables the force acting to push out the load support body toward the tire lateral direction inside to be mitigated and the load support body to be stably retained during run-flat traveling.

In addition, the load support body can include a plurality of divided pieces divided in a tire radial direction, and the plurality of divided pieces come into contact with each other during run-flat traveling. In this case, good durability can be ensured due to each divided piece being secured by a mechanical engagement device, and furthermore, deterioration of the rolling resistance and riding comfort can be suppressed in comparison with a case in which the load support body is formed as an integral body.

The hardness of the plurality of divided pieces constituting the load support body can be made different from each other. Characteristics during a run-flat traveling can be arbitrarily adjusted by making hardness of the plurality of divided pieces different from each other. For example, durability during run-flat traveling can be improved by making the hardness of a plurality of divided pieces gradually decreased toward the inner side in the tire radial direction.

It is preferable that the load support body is housed in a bladder and the bladder is mounted to the inner surface of the sidewall portion by the mechanical engagement device. In this case, minimizing of direct contact between the load support body and the sidewall portion effectively suppresses deterioration of rolling resistance and riding comfort during normal traveling.

The load support body is preferably constituted by rubber, or by a resin having a melting point or a thermal decomposition temperature of 150° C. or higher. Such a material is suitable as a constituent material of the load support body.

DETAILED DESCRIPTION

Figure 1:
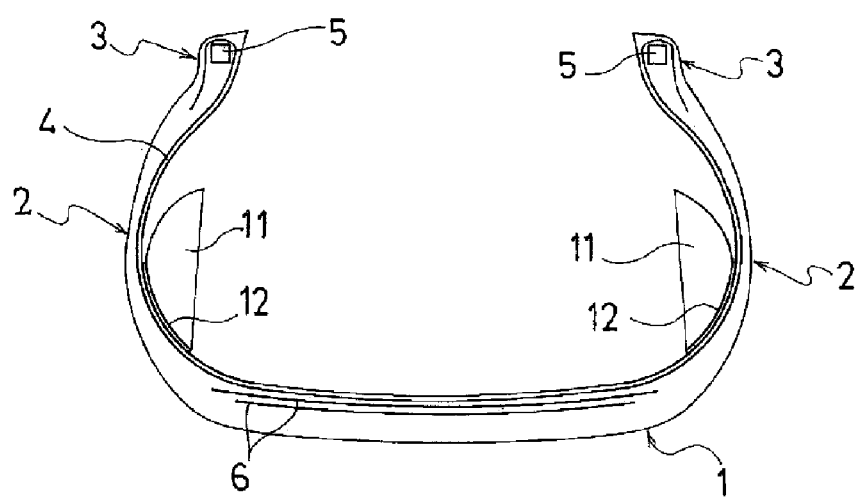
FIG. 1 is a meridian cross-sectional view illustrating a pneumatic tire according to an embodiment of the present technology.
Figure 2:
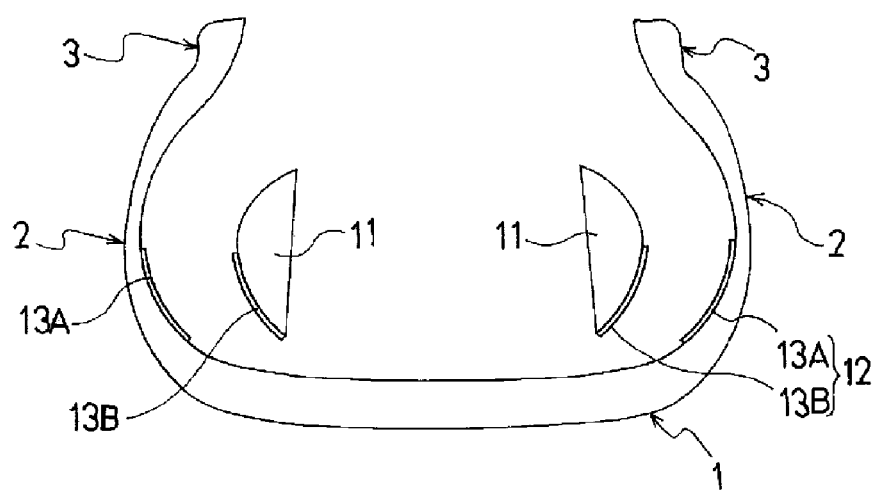
FIG. 2 is a meridian cross-sectional view illustrating the pneumatic tire of FIG. 1 in a state in which a load support body has been removed.
Figure 3:
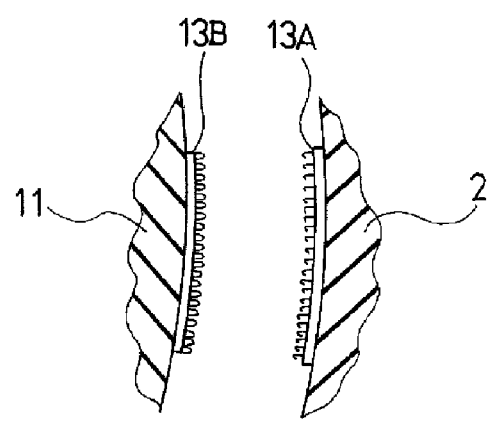
FIG. 3 is a cross-sectional view illustrating a pair of surface fasteners used as mechanical engagement devices in the pneumatic tire of FIG. 1.

Configurations of embodiments of the present technology are described in detail below with reference to the accompanying drawings. FIGS. 1 to 4 illustrate a pneumatic tire according to an embodiment of the present technology. FIG. 1 illustrates a reinforcing structure of a pneumatic tire, but in other figures the depiction of the reinforcing structure is omitted.

As illustrated in FIG. 1, a pneumatic tire of the present embodiment includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction.

At least one carcass layer 4 is mounted between the pair of bead portions 3, 3. The carcass layer 4 includes a plurality of carcass cords oriented in the tire radial direction. The carcass layer 4 is folded back around a bead core 5 disposed in each of the bead portions 3 from the tire inner side to the tire outer side. Organic fiber cords are preferably used as the carcass cords of the carcass layer 4.

A plurality of belt layers 6 are embedded on the outer circumferential side of the carcass layer 4 in the tread portion 1. The belt layers 6 include a plurality of reinforcing cords that are inclined with respect to the tire circumferential direction with the reinforcing cords of the different layers arranged in a criss-cross manner. In the belt layers 6, an inclination angle of the reinforcing cords with respect to the tire circumferential direction ranges from, for example, 10° to 40°. Steel cords are preferably used as the reinforcing cords of the belt layers 6.

Note that the tire reinforcement structure described above represents a typical example for a pneumatic tire, and the pneumatic tire is not limited thereto.

Figure 4:
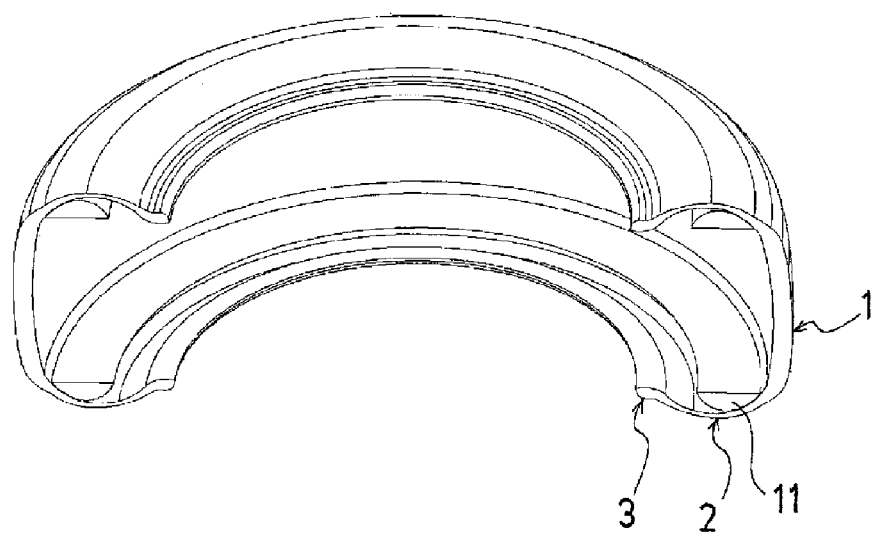
FIG. 4 is a perspective cross-sectional view illustrating the pneumatic tire of FIG. 1.
Figure 5:
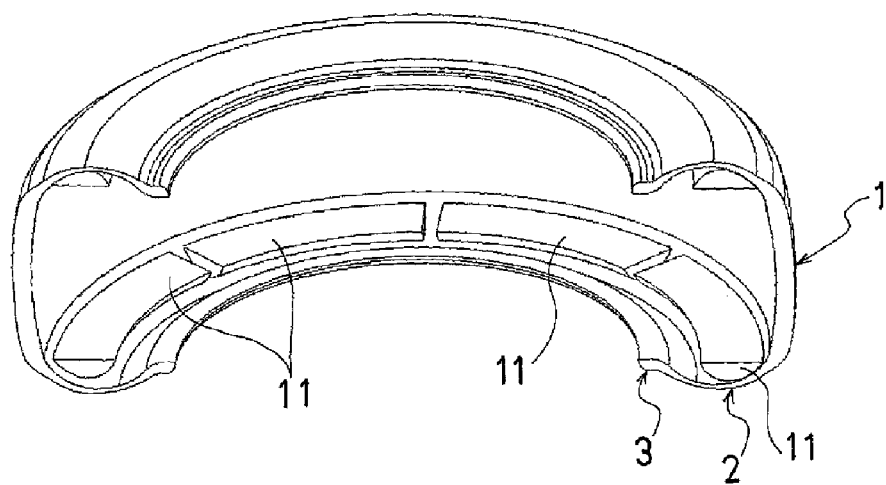
FIG. 5 is a perspective cross-sectional view illustrating a pneumatic tire provided with a load support body intermittently arranged along a circumferential direction of a tire.

In the pneumatic tire described above, a load support body 11 extending along the tire circumferential direction is disposed on the inner side of each of the sidewall portions 2. A load support body 11 is disposed at least on the inner side of the sidewall portion 2 on one side and preferably disposed on the inner side of the sidewall portions 2 on both sides. As illustrated in FIG. 4, the load support body 11 preferably is continuous in the tire circumferential direction. However, the load support body 11 may also be arranged intermittently along the tire circumferential direction (see FIG. 5). In the case in which the load support body 11 is an annular body continuous in the tire circumferential direction, it can be inserted into a pneumatic tire by means of being deformed into an elliptical shape. On the other hand, when the load support bodies 11 are small pieces intermittently arranged along the tire circumferential direction, insertion into the inside of the pneumatic tire is easy.

The load support body 11 is constituted by rubber or resin. When the load support body 11 is constituted by rubber, its JIS-A hardness is preferably in the range from 55 to 90. When the load support body 11 is constituted by a resin, the melting point or thermal decomposition temperature of the resin is preferably 150° C. or higher. Namely, since the temperature of the load support body 11 rises during run-flat traveling, plastic deformation of the load support body 11 can be prevented by using a resin having a melting point or thermal decomposition temperature of 150° C. or higher. In particular, when the load support body 11 is constituted by a resin, a thermosetting resin foam may be preferably used.

The load support body 11 is removably mounted to the inner surface of the sidewall portion 2 via a mechanical engagement device 12. The mechanical engagement device 12 refers to a connecting means including a pair of engaging tools enabling mechanical engagement and includes, for example, a pair of surface fasteners and a pair of buttons. In FIGS. 1 to 4, a pair of surface fasteners 13A and 13B (see FIG. 3) is used as the mechanical engagement device 12. The hook-side surface fastener 13A is fixed to the inner surface of the sidewall portion 2 by, for example, vulcanization bonding, and the loop-side surface fastener 13B is fixed to the load support body 11 by, for example, an adhesive. Such a pair of surface fasteners 13A, 13B, enables the load support body 11 to be stably retained during run-flat traveling.

The shear force in the engaged state of the pair of surface fasteners 13A, 13B is preferably equal to or greater than 0.6 kgf/cm$^2$, and is more preferably in the range from 0.7 kgf/cm$^2$ to 2.5 kgf/cm$^2$. In addition, the peel strength in the engaged state of the pair of surface fasteners 13A and 13B is preferably equal to or greater than 200 gf/cm, and more preferably in the range from 250 gf/cm to 800 gf/cm. The retention capability to retain the load support body 11 during run-flat traveling can be thereby sufficiently secured. In a case where the shear force or the peel strength described above is too small, the retention capability of the load support body 11 during the run-flat traveling decreases. In order to secure such shear force or peel strength, in the loop-side fastener 13B, the height of the loop material from the surface of the base material is preferably configured in the range from 0.5 mm to 4.0 mm.

Figure 6:
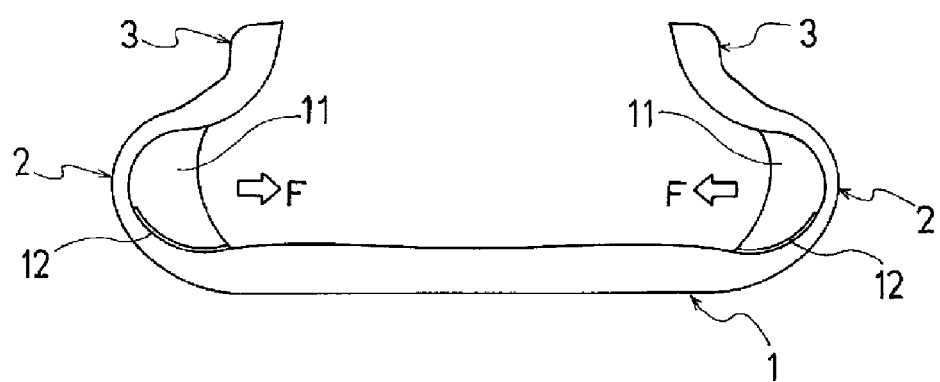
FIG. 6 is a meridian cross-sectional view illustrating the pneumatic tire of FIG. 1 in a run-flat traveling state.

In the above-described pneumatic tire, due to disposing the load support body 11 extending along the tire circumferential direction on the inner side of each sidewall portion 2, and mounting the load support body 11 to the inner surface of the sidewall portion 2 via the mechanical engagement device 12, when the pneumatic tire is punctured, the load support body 11 is put in a state of being wrapped by the deflected sidewall portion 2 as illustrated in FIG. 6, enabling a stable run-flat traveling. In particular, by performing vulcanization without applying a release agent to the inner surface of the tire at the time of tire vulcanization, the frictional force of the load support body 11 against the inner surface of the tire is increased, and the stability of the run-flat traveling can be enhanced.

At the same time, due to the load support body 11 not being integrally formed with the sidewall portion 2, deterioration of rolling resistance and riding comfort during normal traveling can be suppressed to the minimum in comparison with the case in which the side reinforcing layer constituted by a rubber composition is integrally formed on the inner side of the side wall portion 2 as in the related art. Namely, since the load support body 11 mounted via the mechanical engagement device 12 has little influence on the deflection characteristics of the sidewall portion 2, it does not substantially deteriorate the rolling resistance and the riding comfort.

In addition, since the load support body 11 is removably mounted to the inner surface of the sidewall portion 2 via the mechanical engagement member 12, even if the load support body 11 is damaged during the run flat traveling, the tire itself can be reused by exchanging only the load support body 11. Therefore, as described above, the pneumatic tire provided with the removable load support body 11 has excellent reusability after run-flat traveling.

Moreover, the above-described configuration is also applicable to a pneumatic tire having a high aspect ratio, and is also advantageous in making manufacturing of a run-flat tire easy. Naturally, the physical properties of the load support body 11 can be optimized according to the load conditions and the like.

As illustrated in FIGS. 1 and 6, the pneumatic tire described above is configured such that the mechanical engagement device 12 is disposed on part of a region of surface of the load support body 11 contacting the inner surface of the side wall portion 2 during run-flat traveling, and in other region the load support body 11 directly contacts the inner surface of the side wall portion 2 without being interposed by the mechanical engagement device 12. More specifically, the mechanical engagement device 12 is selectively disposed only in the region of the load support body 11 outside the tire radial direction. In this case, the contact area between the load support body 11 and the sidewall portion 2 during normal traveling is reduced, so that deterioration of rolling resistance and ride comfort during normal traveling can be effectively suppressed. However, even in the case in which the mechanical engagement device 12 is disposed over the entire area of the surface of the load support body 11 which contacts the inner surface of the sidewall portion 2 during the run-flat traveling, the rolling resistance and the ride comfort during normal running can be improved.

Figure 7:
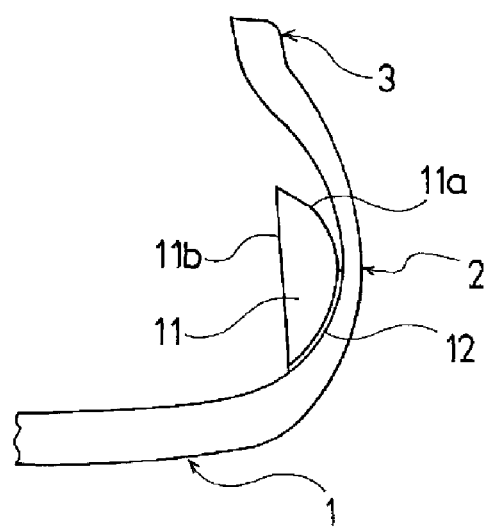
FIG. 7 is a meridian cross-sectional view illustrating a main part of the pneumatic tire of FIG. 1.
Figure 8:
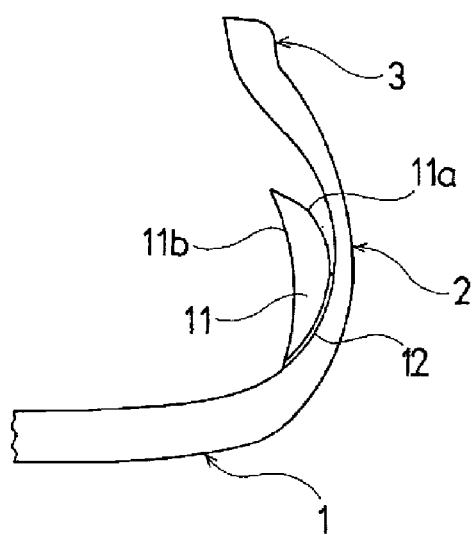
FIG. 8 is a meridian cross-sectional view illustrating a main part of a pneumatic tire provided with a load support body having different shape of the inner wall surfaces.

In addition, the load support body 11 has an outer wall surface 11a (a wall surface on the outer side in the tire lateral direction) contacting the inner surface of the sidewall portion 2 and an inner wall surface lib (a wall surface on the tire radial direction inner side) facing the tire inner cavity side, and the inner wall surface 11b is preferably a flat surface (see FIG. 7) or a curved surface recessed outward in the tire lateral direction (see FIG. 8). As illustrated in FIG. 6, a force F to push the load support body 11 inward in the tire lateral direction acts during run-flat traveling. Defining the shape of the inner wall surface lib of the load support body 11 as described above enables the force acting to push out the load support body 11 inward in the tire lateral direction to be mitigated and the load support body 11 to be stably retained during run-flat traveling. In particular, in a case in which the inner wall surface 11b is a curved surface recessed outward in the tire lateral direction, the load support body 11 can be more stably retained as the sidewall portion 2 deflects during the run flat traveling.

Figure 9:
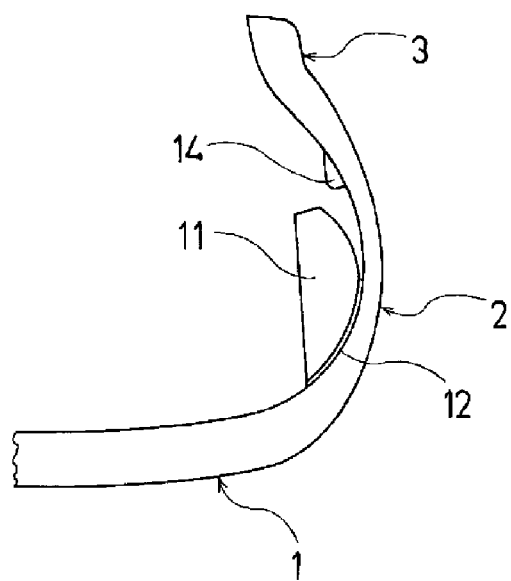
FIG. 9 is a meridian cross-sectional view illustrating a main part of a pneumatic tire provided with a projection on the inner surface of a sidewall portion.
Figure 10:
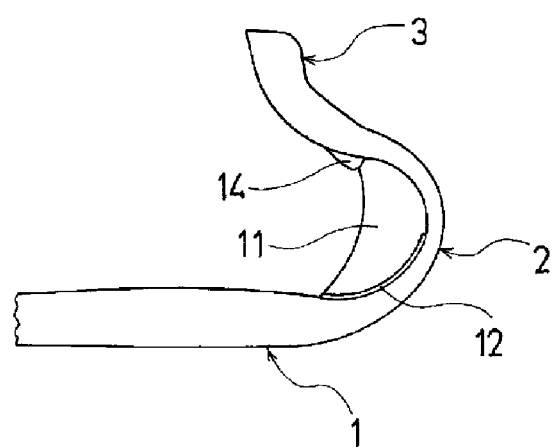
FIG. 10 is a meridian cross-sectional view illustrating the pneumatic tire of FIG. 9 in a run-flat traveling state.

FIGS. 9 and 10 illustrate a pneumatic tire provided with a projection on the inner surface of the sidewall portion. In FIG. 9, a projection 14 is formed on the inner surface of the sidewall portion 2 to lock the end portion of the load support body 11 during run-flat traveling. In a case in which the projection 14 for locking the end portion of the load support body 11 is provided on the inner surface of the sidewall portion 2 in this manner, the end portion of the load support body 11 is locked by the projection 14 as illustrated in FIG. 10 during run-flat traveling, thereby enhancing the integrity of the load support body 11 and the sidewall portion 2. The durability during run-flat traveling can be improved as a result.

Figure 11:
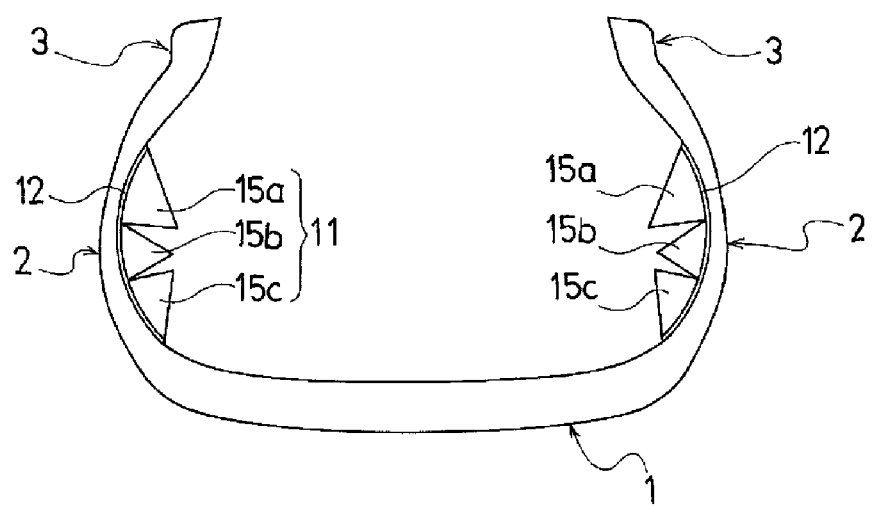
FIG. 11 is a meridian cross-sectional view illustrating a pneumatic tire provided with a load support body having a plurality of divided pieces divided in the tire radial direction.
Figure 12:
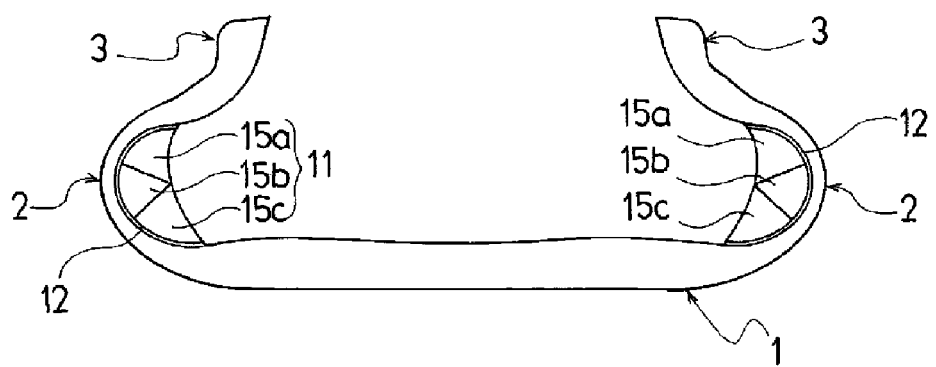
FIG. 12 is a meridian cross-sectional view illustrating the pneumatic tire of FIG. 11 in a run-flat traveling state.

FIGS. 11 and 12 illustrate a pneumatic tire provided with a load support body including a plurality of divided pieces divided in the tire radial direction. In FIG. 11, the load support body 11 includes a plurality of divided pieces 15a, 15b, 15c divided in the tire radial direction, and these divided pieces 15a to 15c are configured to contact each other during run-flat traveling. In FIG. 11, the divided pieces 15a to 15c are completely independent. Each of the divided pieces 15a to 15c is removably mounted to the inner surface of the sidewall portion 2 via a mechanical engagement device 12.

As illustrated in FIG. 12, when the pneumatic tire is punctured, the load support body 11 constituted by the divided pieces 15a to 15c is put in a state of being wrapped by the deflected sidewall portion 2, thereby enabling the stable run-flat traveling. In such a configuration, good durability can be ensured due to the divided pieces 15a to 15c being secured by a mechanical engagement device 12, and furthermore, deterioration of the rolling resistance and riding comfort can be suppressed in comparison with a case in which the load support body 11 is formed as an integral body.

Further, the hardness of the plurality of divided pieces 15a to 15c constituting the load support body 11 may be uniform, or the hardness may be different from each other. Characteristics relating to run-flat traveling can be discretionarily adjusted by setting the hardness of the plurality of divided pieces 15a to 15c differently from each other. For example, when the hardness of the plurality of divided pieces 15a to 15c is gradually reduced toward the inner side in the tire radial direction, the durability during a run-flat traveling can be improved.

Figure 13:
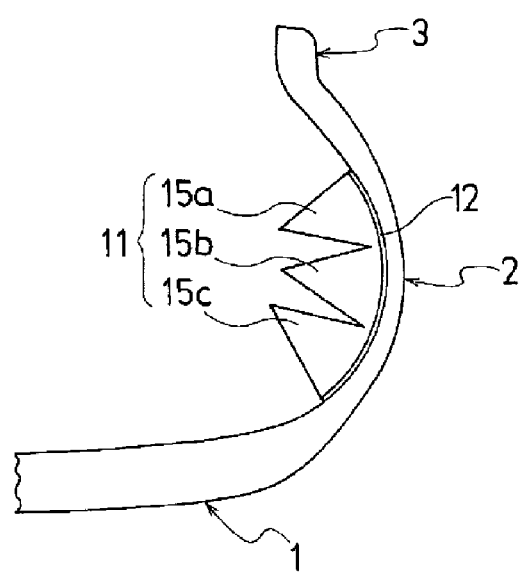
FIG. 13 is a cross-sectional view illustrating a main part of a pneumatic tire provided with another load support body having a plurality of divided pieces divided in the tire radial direction.
Figure 14:
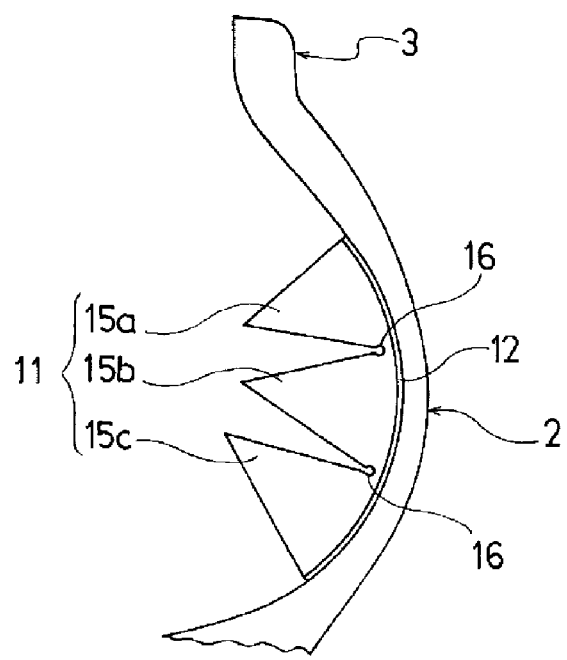
FIG. 14 is a cross-sectional view illustrating a main part of a pneumatic tire provided with still another load support body having a plurality of divided pieces divided in the tire radial direction.

FIGS. 13 and 14 illustrate a pneumatic tire provided with another load support body having a plurality of divided pieces divided in the tire radial direction. The divided pieces 15a to 15c constituting the load support body 11 may be completely independent or may be partially connected to each other as illustrated in FIGS. 13 and 14. In addition, as illustrated in FIG. 14, the divided pieces 15a to 15c are preferably connected to each other via the curved portion 16. Cracks are less likely to occur between the divided pieces 15a to 15c by providing such a curved portion 16.

Figure 15:
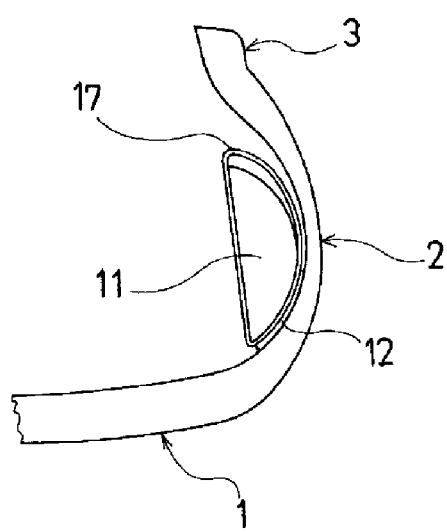
FIG. 15 is a meridian cross-sectional view illustrating a main part of a pneumatic tire provided with a load support body housed in a bladder.
Figure 16:
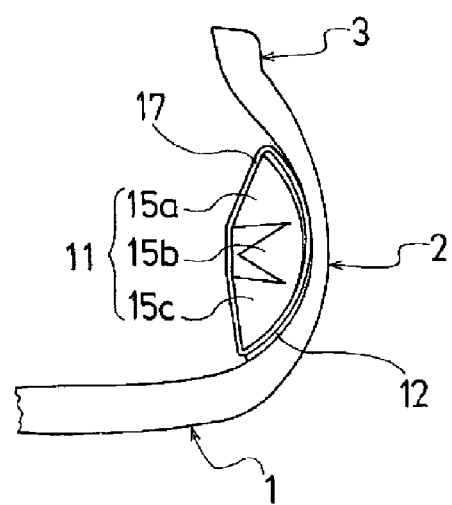
FIG. 16 is a meridian cross-sectional view illustrating a main part of a pneumatic tire provided with another load support body housed in a bladder.

FIGS. 15 and 16 illustrate a pneumatic tire provided with a load support body housed in a bladder. In FIG. 15, the load support body 11 is housed in the bladder body 17, and the bladder body 17 is removably mounted to the inner surface of the sidewall portion 2 by the mechanical engagement device 12. In FIG. 16, a load support body 11 including the plurality of divided pieces 15a to 15c is housed in the bladder body 17, and the bladder body 17 is removably mounted to the inner surface of the sidewall portion 2 by the mechanical engagement device 12. Only a part of the load support body 11 (for example, the inner wall surface facing the tire cavity side) is fixed with respect to the bladder body 17, and other parts are in a state freely positionable with respect to the bladder body 17. In addition, at least a part of the bladder body 17 is constituted by a loop-side surface fastener, which itself forms a part of the mechanical engagement device. When load support body 11 is mounted on the inner surface of the sidewall portion 2 using such a bladder body 17, since a direct contact between the load support body 11 and the sidewall portion 2 is minimized, deterioration of rolling resistance and riding comfort during normal traveling can be effectively suppressed.

Figure 17:
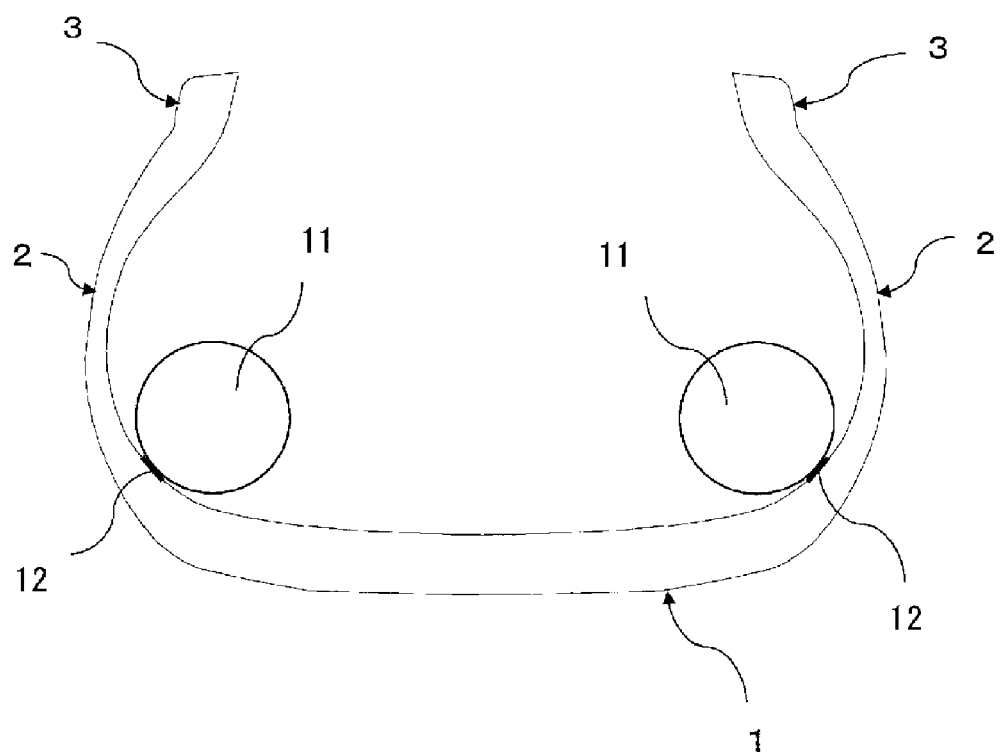
FIG. 17 is a meridian cross-sectional view illustrating a pneumatic tire provided with a load support body having a circular cross-sectional shape.
Figure 18:
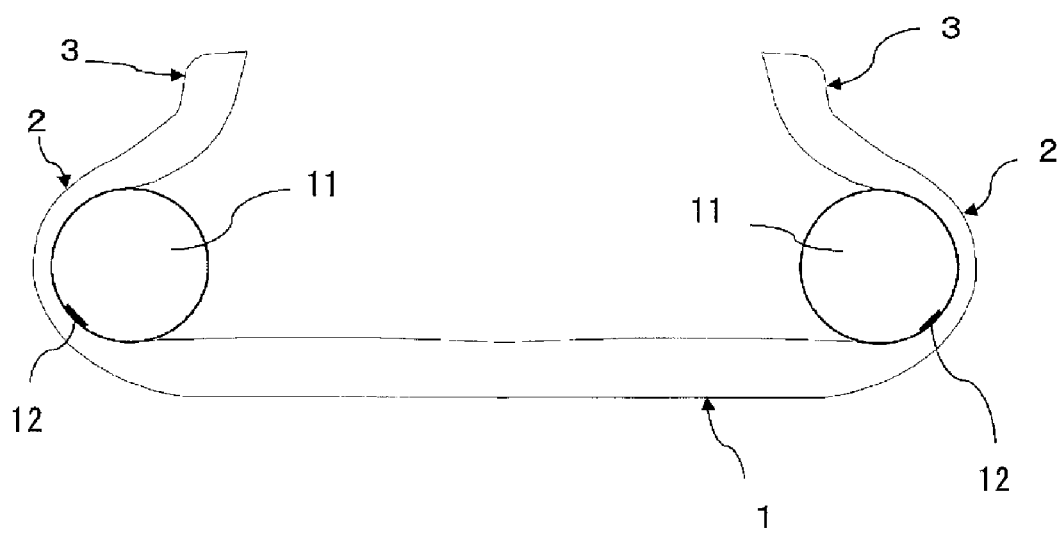
FIG. 18 is a meridian cross-sectional view illustrating the pneumatic tire of FIG. 17 in a run-flat traveling state.

FIGS. 17 and 18 illustrate a pneumatic tire provided with a load support body having a circular cross-sectional shape. In FIG. 17, the load support body 11 has a circular cross-sectional shape and is removably mounted to the inner surface of the sidewall portion 2 via a mechanical engagement member 12. By mounting the load bearing member 11 having a circular cross-sectional shape in this manner to the inner surface of the sidewall portion 2, when the pneumatic tire has a puncture, as illustrated in FIG. 18, the load support body 11 is put in a state of being wrapped by the deflected sidewall portion 2. This enables the load support body 11 to be prevented from being compressed and damaged, making a stable run-flat traveling possible. As the mechanical engagement device 12, a pair of surface fasteners, a pair of buttons, and the like can be used.

Figure 19:
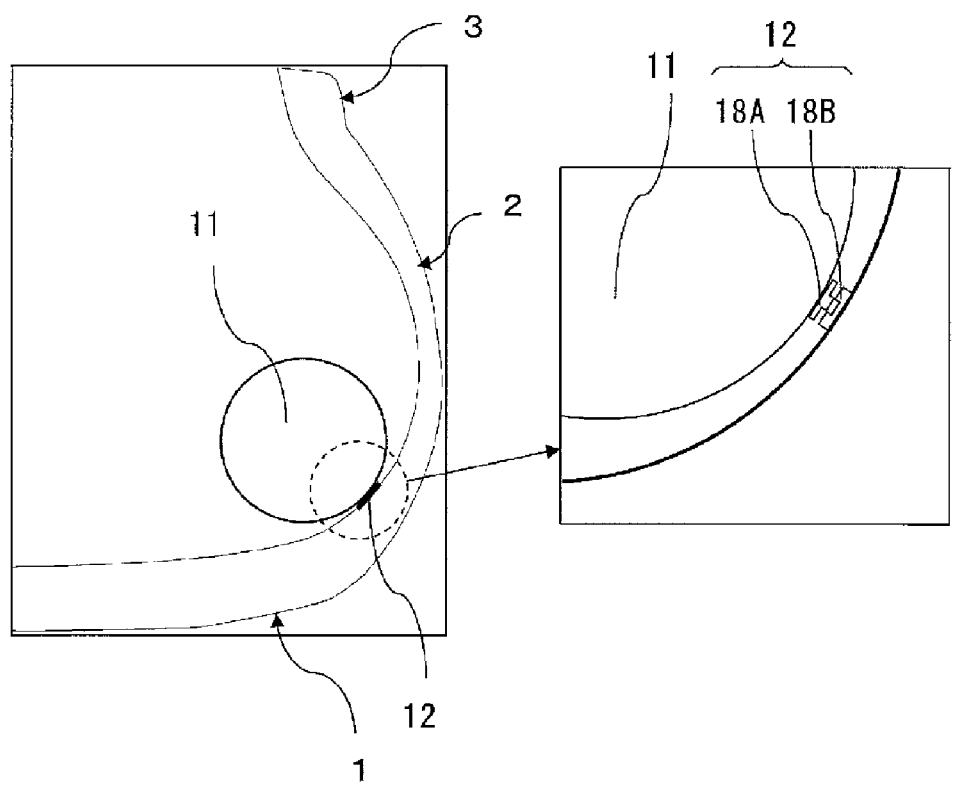
FIG. 19 is a cross-sectional view illustrating a main part of a pneumatic tire using a pair of buttons as a mechanical engagement device.

FIGS. 19 to 22 illustrate a pneumatic tire using a pair of buttons as mechanical engagement devices. In FIG. 19, a pair of buttons 18A, 18B is used as a mechanical engagement device 12 for mounting the load support body 11 to the inner surface of the sidewall portion 2. The button 18A is a male button and the button 18B is a female button. One of the pair of buttons 18A, 18B is directly bonded to the load support body 11, and the other is vulcanization bonded to the inner surface of the tire. The paired buttons 18A and 18B are arranged at a plurality of positions in the tire circumferential direction.

Figure 20:
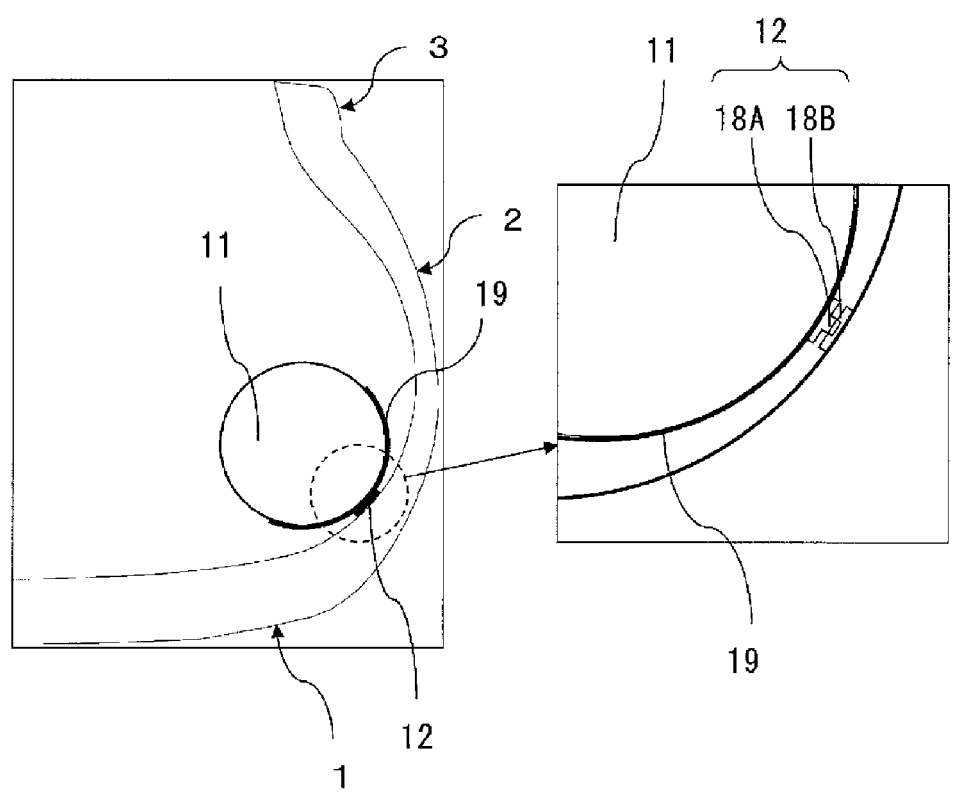
FIG. 20 is a cross-sectional view illustrating a main part of another pneumatic tire using a pair of buttons as a mechanical engagement device.

In FIG. 20, a pair of buttons 18A, 18B is used as the mechanical engagement device 12. One of the pair of buttons 18A, 18B is fixed to the sheet material 19 adhered to the surface of the load support body 11 and the other is vulcanization bonded to the inner surface of the tire. It is possible to use one of the pair of buttons 18A and 18B in a state fixed to the sheet material 19 in this manner.

Figure 21:
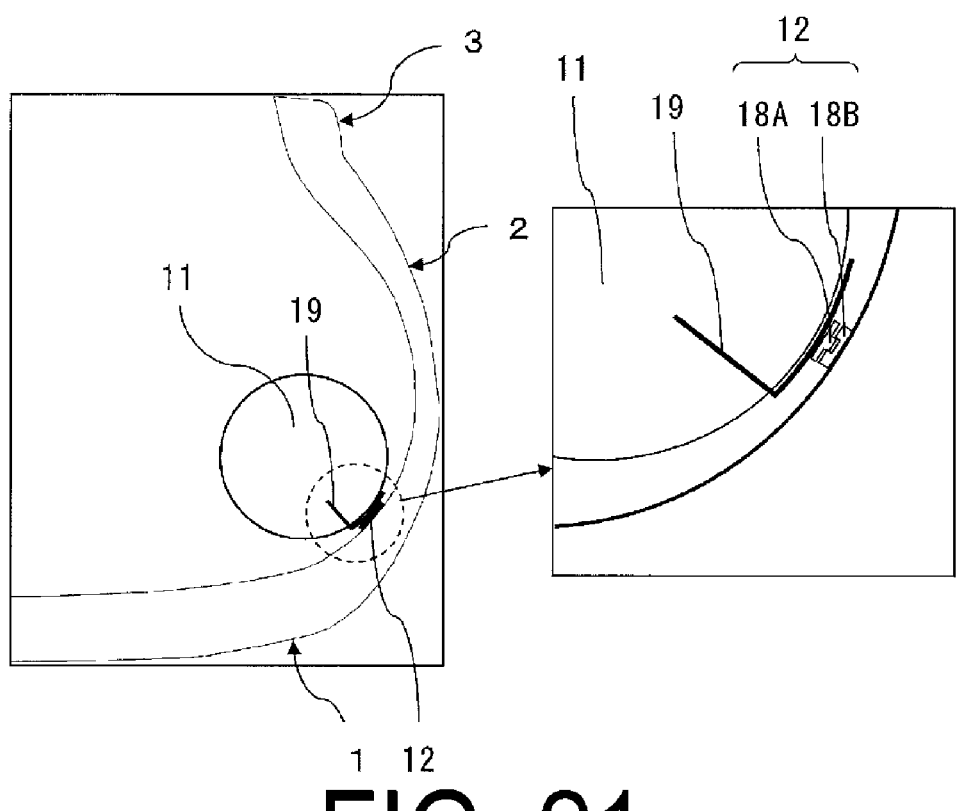
FIG. 21 is a cross-sectional view illustrating a main part of still another pneumatic tire using a pair of buttons as a mechanical engagement device.
Figure 22:
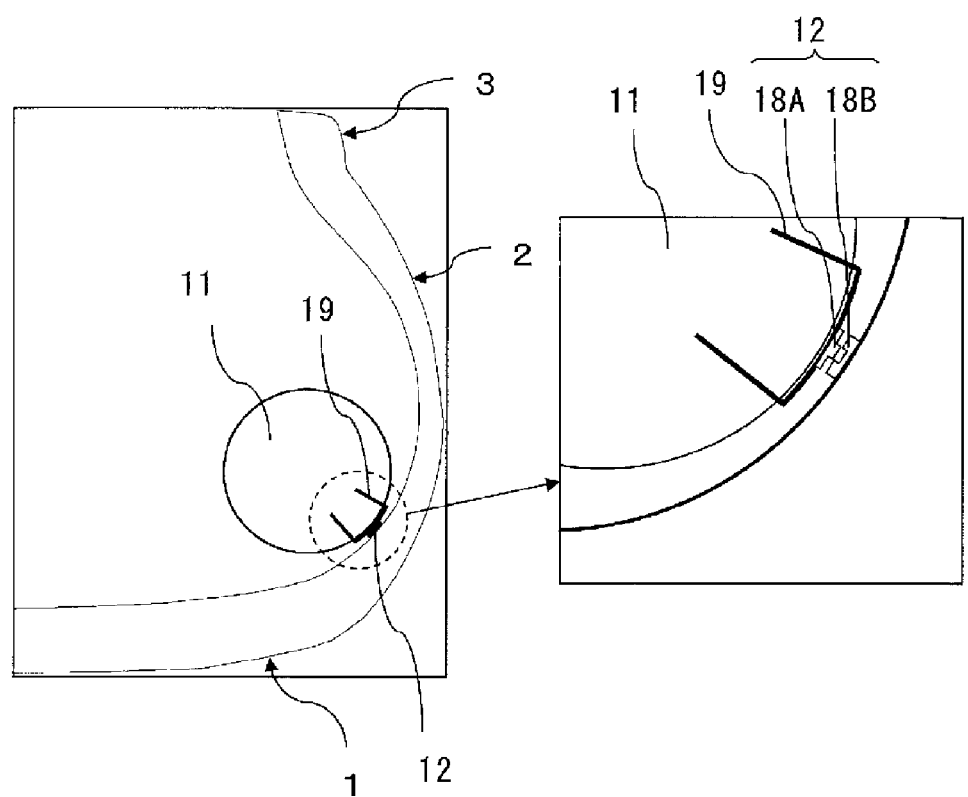
FIG. 22 is a cross-sectional view illustrating a main part of still another pneumatic tire using a pair of buttons as a mechanical engagement device.

In FIGS. 21 and 22, a pair of buttons 18A, 18B is used as the mechanical engagement device 12. One of the pair of buttons 18A, 18B is fixed to the sheet material 19 which is partially embedded in the load support body 11 and the other is vulcanization bonded to the inner surface of the tire. In the example of FIG. 21, only one end portion of the sheet material 19 is buried in the load support body 11, and in the example of FIG. 22, both end portions of the sheet material 19 are buried in the load support body 11. For example, in the case of molding the load support body 11 with foamed resin, it is possible to fix the sheet material 19 with extremely high strength, by inserting a part of the sheet material 19 into the inside of the foaming mold, and performing foaming and curing in a state in which the sheet material 19 is included.

Figure 23:
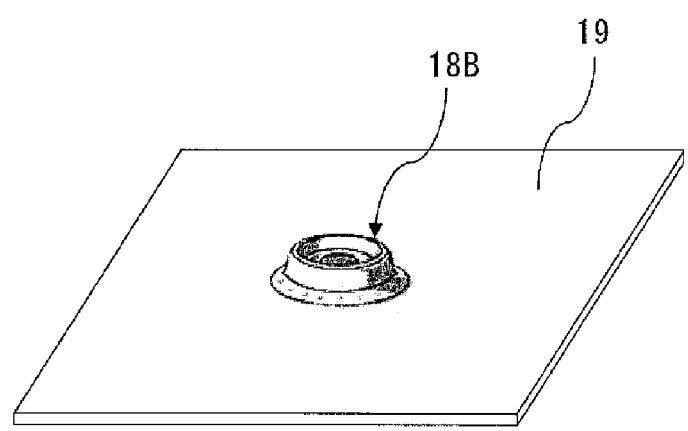
FIG. 23 is a perspective view illustrating a state in which one button constituting a mechanical engagement device is fixed to a sheet material.
Figure 24:
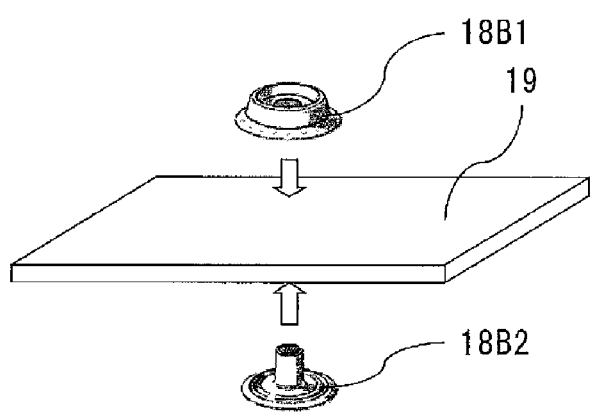
FIG. 24 is a perspective view illustrating a method of fixing one button constituting a mechanical engagement device to a sheet material.
Figure 25:
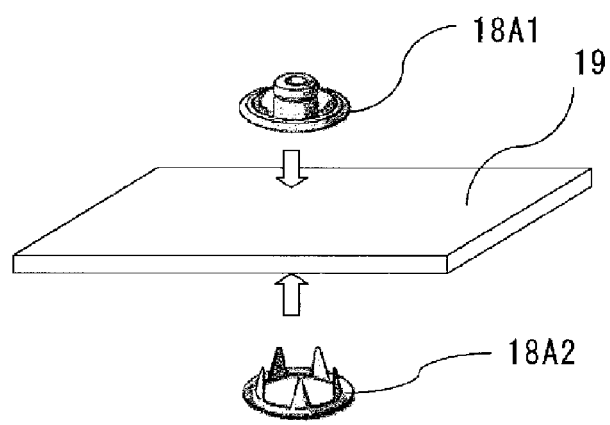
FIG. 25 is a perspective view illustrating a method of fixing the other button constituting the mechanical engagement device to the sheet material.

FIG. 23 illustrates a state in which one button constituting the mechanical engagement device is fixed to the sheet material, FIG. 24 illustrates a method of fixing one button to the sheet material, and FIG. 25 illustrates a method of fixing the other button to the sheet material. In FIG. 23, the button 18B is fixed to the sheet material 19. While the material of the sheet material 19 is not particularly limited, for example, a resin sheet, a rubber sheet, a fiber sheet (woven fabric, knitted fabric, nonwoven fabric), a fiber reinforced resin sheet, a fiber reinforced rubber sheet or the like is used. As illustrated in FIG. 24, the button 18B is constituted by an engaging member 18B1 and a backing member 18B2. The button 18B can be firmly fixed to the sheet material 19 by fastening the engaging member 18B1 and the backing member 18B2 together, with the sheet material 19 interposed therebetween. Similarly, as illustrated in FIG. 25, the button 18A is constituted by an engaging member 18A1 and a backing member 18A2. The button 18A can be firmly fixed to the sheet material 19 by fastening the engaging member 18A1 and the backing member 18A2 together, with the sheet material 19 interposed therebetween.

Figure 26:
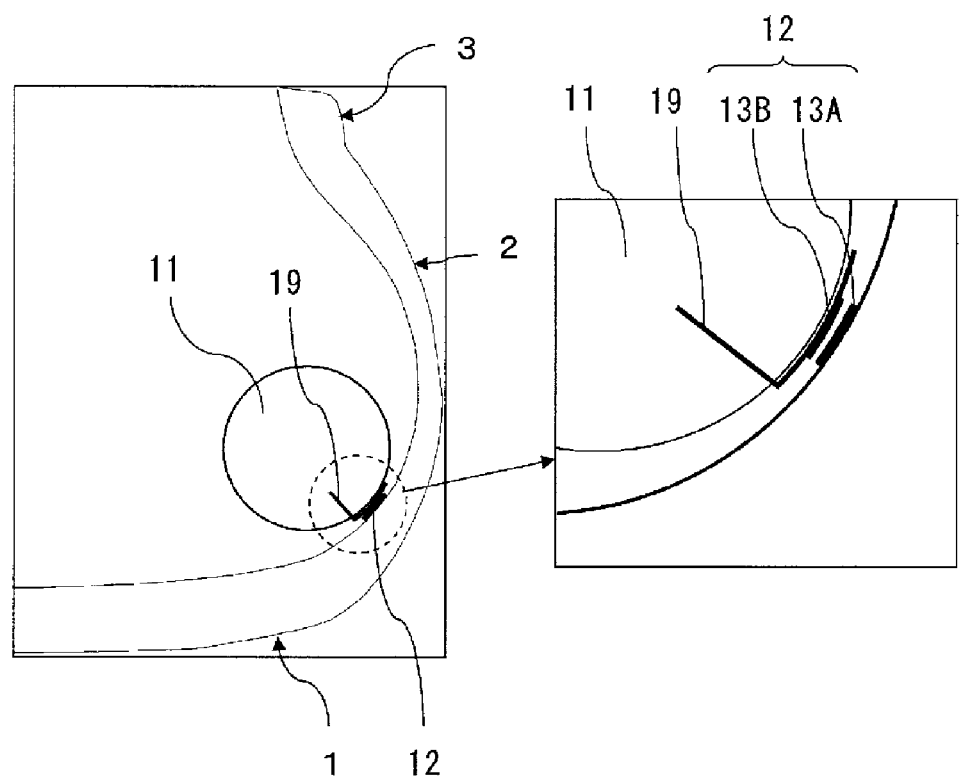
FIG. 26 is a cross-sectional view illustrating a main part of a pneumatic tire using a pair of surface fasteners as a mechanical engagement device.
Figure 27:
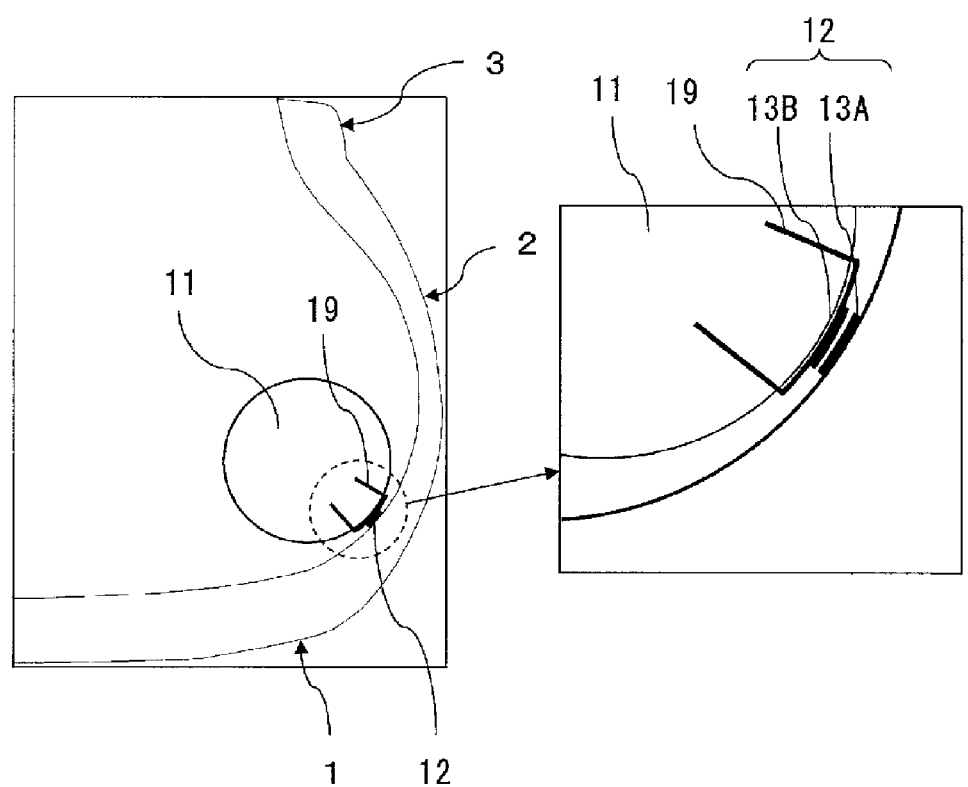
FIG. 27 is a cross-sectional view illustrating a main part of another pneumatic tire using a pair of surface fasteners as a mechanical engagement device.

FIGS. 26 to 29 illustrate a pneumatic tire using a pair of surface fasteners as mechanical engagement devices. In FIG. 26, a pair of surface fasteners 13A, 13B is used as a mechanical engagement device 12 for mounting the load support body 11 on the inner surface of the sidewall portion 2. The surface fastener 13A is a hook material, and the surface fastener 13B is a loop material. One of the pair of surface fasteners 13A, 13B is fixed to the sheet material 19 partially buried in the load support body 11, and the other is vulcanization bonded to the inner surface of the tire. In the example of FIG. 26, only one end portion of the sheet material 19 is buried in the load support body 11, and in the example of FIG. 27, both end portions of the sheet material 19 are buried in the load support body 11. For example, in the case of molding the load support body 11 with foamed resin, it is possible to fix the sheet material 19 to the load support body 11 with extremely high strength, by inserting a part of the sheet material 19 into the inside of the foaming mold, and performing foaming and curing in a state in which the sheet material 19 is included.

Figure 28:
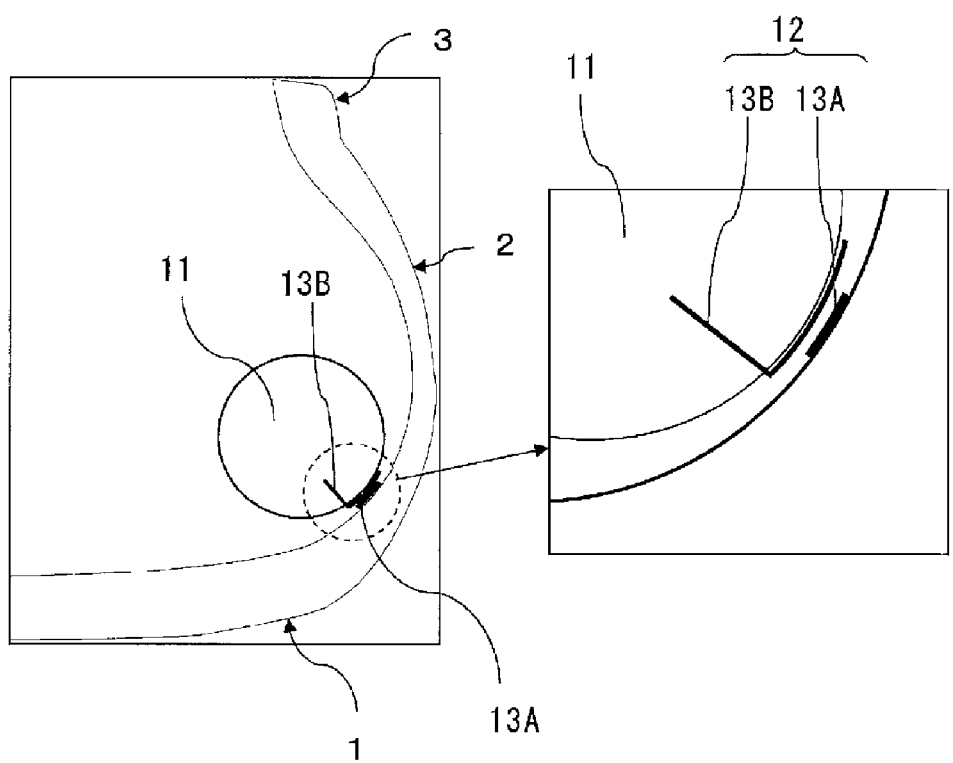
FIG. 28 is a cross-sectional view illustrating a main part of still another pneumatic tire using a pair of surface fasteners as a mechanical engagement device.
Figure 29:
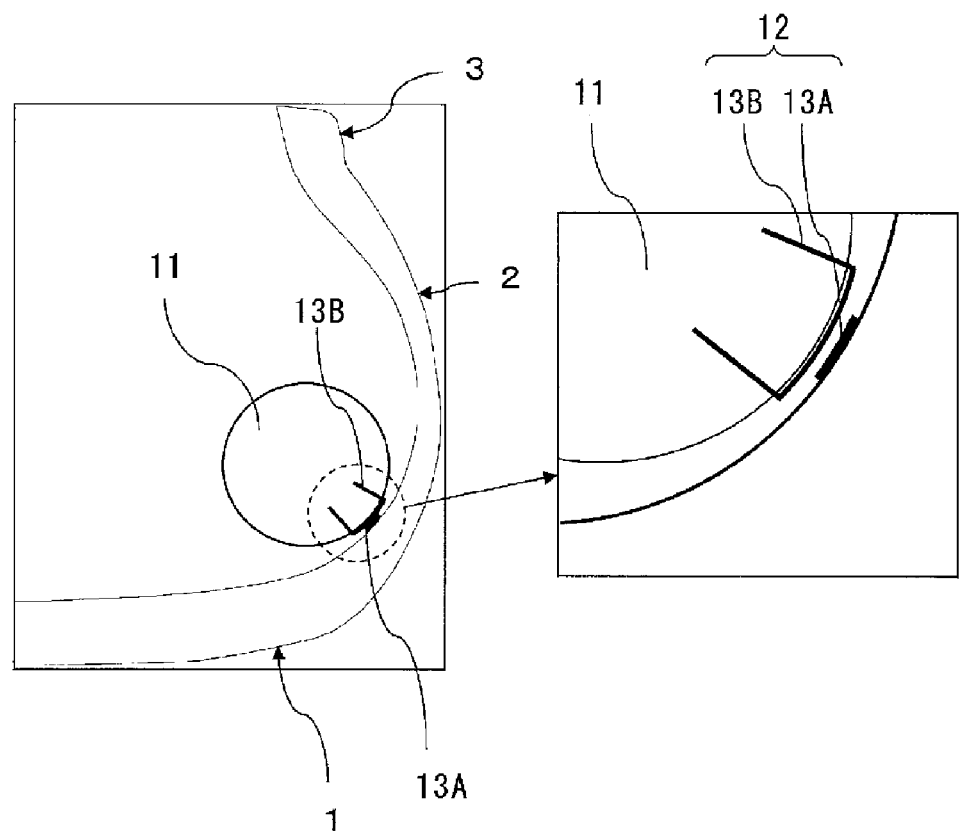
FIG. 29 is a cross-sectional view illustrating a main part of still another pneumatic tire using a pair of surface fasteners as a mechanical engagement device.

In FIGS. 28 and 29, a pair of surface fasteners 13A, 13B is used as the mechanical engagement device 12, and one of the pair of surface fasteners 13A, 13B is partially embedded in the load support body 11 and the other is vulcanized and adhered to the inner surface of the tire. In the example of FIG. 28, only one end portion of the surface fastener 13B is buried in the load support body 11, and both ends of the surface fastener 13B are buried in the load support body 11 in the example of FIG. 29. For example, in the case of molding the load support body 11 with a foamed resin, it is possible to fix the surface fastener 13A or 13B to the load support body 11 with extremely high strength, by inserting a part of the surface fastener 13A or 13B into the inside of the foaming mold, and performing foaming and curing in a state in which the surface fastener 13A or 13B is included.

EXAMPLE

In a pneumatic tire having a tire size of 265/60R18, the tires of Examples 1 to 10 were manufactured for which a load support body extending along the tire circumferential direction is disposed on the inner side of each sidewall portion, and the load support body is removably mounted to the inner surface of the sidewall portion via a mechanical engagement device. A pair of surface fasteners having shear force of 0.8 kgf/cm$^2$ and peel strength of 400 gf/cm was used as a mechanical engagement device. A pair of buttons was used as another mechanical engagement device. Such a mechanical engagement device was installed at a plurality of positions in the tire circumferential direction.

For comparison, the tire of a conventional example having a side reinforcing layer constituted by a rubber composition integrally formed on the inner side of each sidewall portion was prepared. In addition, a tire of a comparative example was manufactured, for which a load support body was arranged extending along the tire circumferential direction on the inner side of each sidewall portion, and the load support body was fixed to the inner surface of the sidewall portion with an adhesive.

Ride comfort and run-flat travel distance were evaluated for these test tires according to the following evaluation methods. The results are shown in Table 1.

Ride Comfort

Each of the test tires was assembled to a wheel with a rim size of 18×8J, mounted on the test vehicle, and inflated to the air pressure of 230 kPa. The vehicle was run on the asphalt road surface test course at the average speed of 80 km/h, and a sensory evaluation was conducted by the driver. Evaluation results are expressed as index values with the value of the conventional example being defined as 100. Larger index values indicate superior ride comfort.

Run-Flat Travel Distance

Each of the test tires was assembled to a wheel with a rim size of 18×8J, mounted on the test vehicle, and while removing the valve core for the right driving wheel, the other wheels were inflated to the air pressure of 230 kPa. The vehicle was run on the asphalt road surface test course at the average speed of 80 km/h, the travel was continued until tire failure made travel impossible or until the driver felt vibration caused by the failure of the tire, and the travel distance was measured. Longer travel distance indicates superior run-flat durability.

TABLE 1

|  | Conventional Example | Comparative Example | Example 1 | Example 2 | Example 3 | Example 4 |
|---|---|---|---|---|---|---|
| Method of fixing load support body | Vulcanization bonding | Adhesive | Surface fastener | Surface fastener | Surface fastener | Surface fastener |
| Fixed area of load support body | Entire face | Entire face | Entire face | Partially | Partially | Partially |
| Configuration drawing | — | — | — | FIG. 1 | FIG. 8 | FIG. 9 |
| Ride comfort | 100 | 100 | 110 | 120 | 125 | 120 |
| Run flat travel distance (km) | 120 | 35 | 90 | 110 | 110 | 110 |

|  | Example 5 | Example 6 | Example 7 | Example 8 | Example 9 | Example 10 |
|---|---|---|---|---|---|---|
| Method of fixing load support body | Surface fastener | Surface fastener | Surface fastener | Surface fastener | Button | Button |
| Fixed area of load support body | Partially | Partially | Partially | Partially | Partially | Partially |
| Configuration drawing | FIG. 11 | FIG. 13 | FIG. 15 | FIG. 29 | FIG. 20 | FIG. 22 |
| Ride comfort | 120 | 120 | 125 | 125 | 125 | 125 |
| Run flat travel distance (km) | 110 | 110 | 110 | 115 | 110 | 115 |

As can be seen from Table 1, the tires of Examples 1 to 10 were able to realize good run-flat traveling performance, and the ride comfort during normal traveling was good in comparison with the conventional example. On the other hand, in the tire of the comparative example, the run-flat travel performance was inadequate and the ride comfort during normal traveling was also bad, since the load support body is fixed to the inner surface of the sidewall portion with an adhesive.

The invention claimed is:

1. A pneumatic tire, comprising:
an annular tread portion extending in a tire circumferential direction;
a pair of sidewall portions disposed on both sides of the tread portion; and
a pair of bead portions disposed on an inner side of the sidewall portions in a tire radial direction, wherein
a pair of run-flat load support bodies is disposed extending along the tire circumferential direction one on an inner side of each of the respective sidewall portions, and the load support body is removably mounted to an inner surface of the respective sidewall portion via a mechanical engagement device, the mechanical engagement device being disposed only on the inner surface of the respective sidewall portion; and
the pneumatic tire is configured such that the mechanical engagement device is disposed only on a radially outermost part of a region of a surface of the respective run-flat load support body contacting the inner surface of the respective sidewall portion during run-flat traveling, and in the other part of the region the respective run-flat load support body directly contacts the inner surface of the respective sidewall portion without the mechanical engagement device being interposed therebetween.

2. The pneumatic tire according to claim 1, wherein the mechanical engagement device is a pair of surface fasteners.

3. The pneumatic tire according to claim 2, wherein shear force in an engaged state of the pair of surface fasteners is equal to or greater than 0.6 kgf/cm$^2$ and a peel strength is equal to or greater than 200 gf/cm.

4. The pneumatic tire according to claim 2, wherein
the pair of surface fasteners are constituted by a hook-side surface fastener and a loop-side surface fastener,
the hook-side surface fastener is vulcanization-adhered to the inner surface of the respective sidewall portion, and
the loop-side surface fastener is attached to the respective run-flat load support body.

5. The pneumatic tire according to claim 4, wherein shear force in an engaged state of the pair of surface fasteners is equal to or greater than 0.6 kgf/cm$^2$ and a peel strength is equal to or greater than 200 gf/cm.

6. The pneumatic tire according to claim 5, wherein a projection is provided on the inner surface of the respective sidewall portion, configured to lock an end portion of the respective run-flat load support body during run-flat traveling.

7. The pneumatic tire according to claim 6, wherein
the respective run-flat load support body includes the surface contacting the inner surface of the respective sidewall portion as an outer wall surface and an inner wall surface facing a tire inner cavity side, and the inner wall surface is a flat surface or a curved surface recessed outward in a tire lateral direction.

* * * * *